Jan. 10, 1956
E. LAMMERZ ET AL
2,729,980
FLUID TRANSMISSION WITH SUBSEQUENT MULTI-SPEED
CHANGE GEAR TRANSMISSION
Filed June 18, 1954
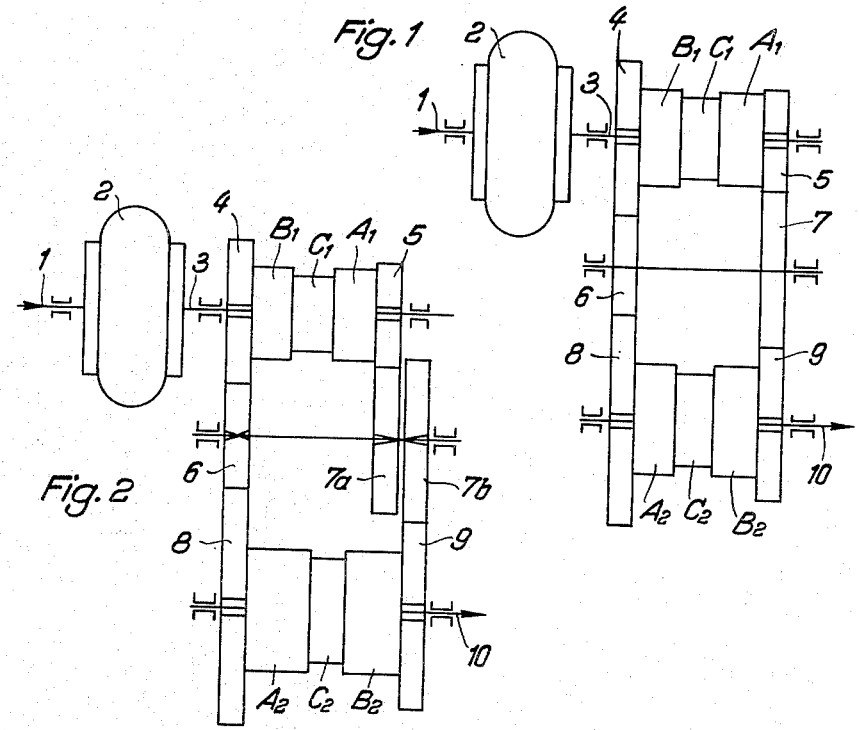
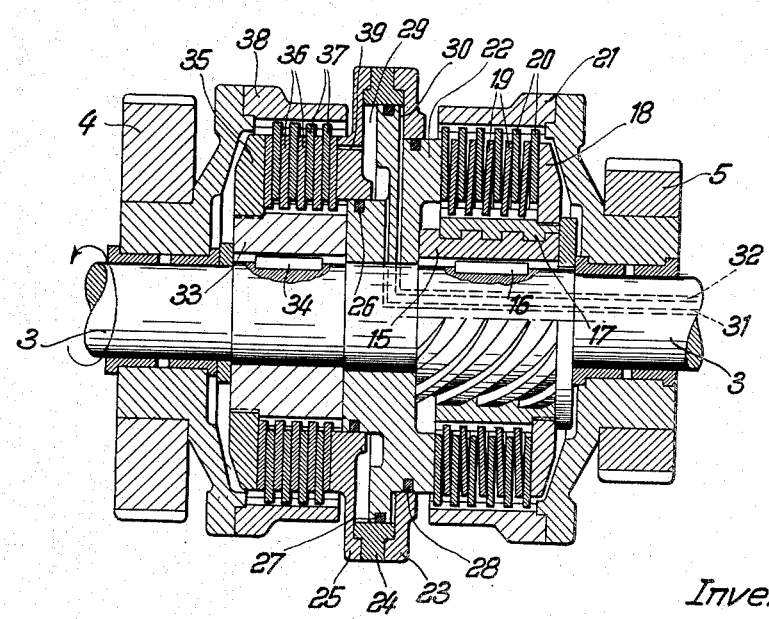
Inventors:
Ernst Lammerz
and
Hugo Rombausek
By
Walter Becker
Patent Agent

United States Patent Office 2,729,980
Patented Jan. 10, 1956

2,729,980

FLUID TRANSMISSION WITH SUBSEQUENT MULTI-SPEED CHANGE GEAR TRANSMISSION

Ernst Lammerz and Hugo Rambausek, Essen, Germany, assignors to Aktiengesellschaft fur Unternehmungen der Eisen- und Stahlindustrie, Essen, Germany Application June 18, 1954, Serial No. 437,774

Claims priority, application Germany June 22, 1953

7 Claims. (Cl. 74—359)

The present invention relates to a multi-speed change gear transmission arranged subsequent to a fluid transmission, and, while not specifically limited to, is of particular advantage in connection with rail vehicles. More specifically, the present invention relates to a multi-speed change gear transmission arrangement of the above type, in which the change from one velocity range to another velocity range is effected by means of friction clutches, said fluid transmission preferably being designed as Föttinger-torque converter with a power-interrupting device.

The heretofore known transmissions of this type, in which the friction clutches may be designed as multiple disc clutches, have the drawback that in the higher velocity ranges, the relative speed of the disconnected first velocity range is very high, particularly when the turbo-torque converter preceding the transmissions has a rather wide driving range. Furthermore, when changing from one velocity range to another velocity range, without overlapping of the change-over operation, an interruption of the pulling force takes place. This makes itself particularly uncomfortably felt in the first speed ranges during the starting of the respective vehicle.

On the other hand with an overlapping shifting operation from one speed to another speed, there exists the danger that the two clutches are not properly adjusted, for instance when the two individual clutches have worn unevenly. Furthermore, the two clutches must be designed as shiftable clutches and, therefore, can be actuated only by a pressure permissible for such clutches. When great forces are to be conveyed, with this last mentioned type of clutches, the known difficulties are encountered concerning dimensioning and cooling.

In order to avoid the interruption of the pulling force and also an overlapping in the shift-over operation, it is also known to employ shiftable overrunning clutches for all velocity ranges with the exception of the highest velocity range. The drawback of this arrangement consists in that each of these clutches must be provided with a shifting mechanism adapted to allow a connection or disconnection of said clutches regardless of the activity of the overrunning mechanism. Furthermore, also with this arrangement, the above mentioned drawbacks as to high relative speed and relatively low pressure are encountered.

It is, therefore, an object of this invention to overcome the above mentioned drawbacks.

It is another object of this invention to provide an arrangement which will make it possible with a given starting torque to obtain relatively small clutches which will work with high surface pressure and low heat development so that even with great jumps between the velocity ranges and with a high number of velocity ranges, only small relative speeds will occur and a shifting over from one speed to another speed will be possible without interrupting the pulling force.

These and other objects and advantages of the invention will appear more clearly from the following specification in connection with the accompanying drawings, in which:

Fig. 1 represents a side view of a three-speed transmission.

Fig. 2 is a side view of a four-speed transmission.

Fig. 3 represents on a somewhat larger scale than that used in connection with Figs. 1 and 2 a longitudinal section through the double clutch shown in Figs. 1 and 2.

*General arrangement*

The problem outlined above has been solved according to the present invention by an arrangement in which the gear transmission has associated therewith one or a plurality of double clutches, depending on the number of velocity ranges, which clutches are respectively arranged on different transmission shafts. These double clutches operate as overrunning clutches in those sections which are associated with the respective lower velocity range, without exerting any change-over effect. For instance for three velocity ranges, a three-shaft transmission is suggested which comprises gears arranged in two planes and in continuous engagement with each other and also comprises two double clutches.

Advantageously, the double clutches are designed as multiple disc clutches. The sets of discs in the automatic overrunning clutch are pressed together by screw means, whereas in the shiftable clutch forming the other part, the sets of discs are pressed together by the pressure of the working means, for instance of the turbo liquid. The various sets of discs are dimensioned in conformity with the maximum torques respectively occurring there, which for instance in the overrunning clutch result from the starting moment of the torque converter or from the output torque which can be exploited due to the friction of the rail vehicle. The said maximum torques in the shiftable clutch actuated by the working means result from the respective lowest velocity range shiftable by said last mentioned clutch.

While correspondingly designing the discs and disc carriers, the overrunning clutches may, according to the invention, be loaded with the maximum pressure per unit area permissible for the material, whereas the surface pressures of the shiftable clutches correspond to the customary permissible relatively lower values. The shiftable clutches are subjected merely to the torque corresponding to the higher velocity ranges because the flow of power in the first velocity range passes through all existing overrunning clutches. In the highest velocity range, only the shiftable clutches are effective. The cooling and lubrication of the shiftable clutches is preferably effected in a manner known per se by the turbo liquid which flows around or through the sets or packets of discs, also when they are compressed, along additional grooves or through bores and the like provided therein. The overrunning clutches have to be lubricated only when in disengaged condition.

According to a further development of the invention, the actuating piston for the shiftable clutches is adapted to be acted upon by the working means on both sides of the piston, namely on one side for the disconnecting or de-clutching operation and on the other side for the pressing or clutching operation. A particularly advantageous design with a short overall length is obtained when the piston on both sides by means of a U-shaped annular member surrounds a supporting flange which simultaneously serves as supporting plate for the disc packet of the adjacent overrunning clutch which packet is compressed by screw means. Furthermore, that working surface of the piston which is acted upon by the working means for throwing in the shiftable clutch is greater than the working surface for the disconnecting or taking out of the clutch. In order to relieve the hydraulic forces of the larger side, said first mentioned working surface is provided with a discharge bore leading to the disc packet of the shiftable clutch, the cross section of which bore is smaller than the cross section of the corresponding supply passage.

Structural arrangement

Referring now to the drawings in detail and Fig. 1 thereof in particular, the arrangement shown therein comprises a turbo torque converter 2 having its pump shaft 1 connected to an internal combustion engine not shown in the drawings. The turbine shaft 3 of the turbo torque converter carries the double clutch $C_1$ which includes the overrunning clutch $A_1$ and the shiftable clutch $B_1$. On both sides of the double clutch there are arranged gears 4 and 5 so that the larger gear 4 is adapted to be connected with the shaft 3 through the shiftable clutch $B_1$, while the smaller gear 5 is adapted to be connected with the shaft 3 through the overrunning clutch $A_1$. The gears 4 and 5 continuously mesh with the gears 6 and 7 respectively keyed to the intermediate shaft. The gears 6 and 7 in their turn are drivingly connected with the gears 8 and 9 respectively which are adapted to be connected with the output shaft 10 through the intervention of the double clutch $C_2$ comprising the overrunning clutch $A_2$ and the shiftable clutch $B_2$.

In the first velocity range, the flow of power takes place through the elements $3-A_1-5-7-6-8-A_2-10$. When changing from the first velocity range to the second velocity range, only the shiftable clutch $B_1$ is thrown in so that the following flow of power will result: $3-B_1-4-6-8-A_2-10$. Inasmuch as in these circumstances the gear 5 driven by the gear 7 rotates faster than the shaft 3, the overrunning clutch $A_1$ will open automatically.

The changeover from the second to the third velocity range is effected by throwing in the further shiftable clutch $B_2$. The corresponding flow of power then takes place through the parts $3-B_1-4-6-7-9-B_2-10$, so that also the overrunning clutch $A_2$ will be opened automatically. Also when during the driving operation in the first or second velocity range, an overrunning on the output side occurs with regard to the turbine shaft 3, one of the overrunning clutches will disconnect itself. Therefore, a racing of the turbine is not possible under any circumstances.

The gears 4, 6, 8 and 5, 7, 9 may be dimensioned so small that the double clutches $C_1$ and $C_2$ extend closely up to the intermediate shaft. This results in a design which has a very compact shape not only as to length but also as to height. Furthermore, the relative speeds in all velocity ranges are relatively low because they are distributed over two clutches.

The arrangement subsequent to the torque converter is advantageous also because, when supplying power, the speed of rotation of the turbine shaft 3, when taking out one of the shiftable clutches $B_1$ or $B_2$, will run into the corresponding overrunning clutch $A_1$ or $A_2$ with a soft torque.

The arrangement according to Fig. 2 differs from that of Fig. 1 merely in that the gear 7 is replaced by a pair of gears 7a, 7b with different pitch diameters. Such an arrangement makes it possible to select the transmission ratios of four velocities in the usual form of a geometric progression. The flow of power in the four velocity ranges will then be as follows:

1st speed: $3-A_1-5-7a-6-8-A_2-10$.
2nd speed: $3-B_1-4-6-8-A_2-10$.
3rd speed: $3-A_1-5-7a-7b-9-B_2-10$.
4th speed: $3-B_1-4-6-7b-9-B_2-10$.

With reference to Fig. 3, showing the double clutch $C_1$ of Figs. 1 and 2 on a somewhat larger scale, the right-hand clutch side shows the inner screw portion of the thread 15 which is connected to the shaft 3 by means of the key 16. The counter thread 17 carries a cover plate 18 which effects the compression of the set of discs or disc packet. The inner discs 19 are likewise connected with the outer screw portion, while the outer discs 20 are connected with the gear 5 through the intervention of the disc carrier 21. A control means represented by a U-shaped actuating piston extends on both sides of and around the supporting flange 22 which is connected to the shaft 3. The supporting flange 22 serves as supporting plate for the disc packet. The said U-shaped actuating piston consists of the elements 23, 24, 25 and forms an actuating member for the shiftable clutch located on the left-hand side (with regard to Fig. 3). By means of the piston rings 26, 27, 28, the two pressure chambers 29 and 30 are sealed. These chambers are adapted to receive liquid through the bores 31 and 32 extending through the shaft 3. The shiftable clutch consists of an inner disc carrier 33 which is keyed to the turbine shaft 3 by means of the key 34. The support of the discs is effected by the counter plate 35. The inner discs 36 are connected to the inner disc carrier 33 while the outer discs 37 are connected to the corresponding disc carrier 38 which in its turn is connected to the gear 4. When the shaft 3 starts to rotate in the direction of the arrow, the disc packet on the right-hand side is compressed due to the screw thread as far as the torque will require. The pressure of the cover plate 18 upon the disc packet brings about the driving connection from shaft 3 through parts $16-15-17-18-19-20-21$ to the gear 5. In this instance, the conduit 32 feeds pressure fluid or working means to piston 23, 24, 25 so that the piston is moved from Fig. 3 position rightwards, and the pressure on the disc packet of the shiftable clutch is relieved.

In order, when shifting to the next higher velocity range, to connect the shaft 3 with the gear 4, the pressure in conduit 32 is relieved and the working means or working fluid is conveyed to the conduit 31. The piston then occupies the position shown in Fig. 3 while the disc packet 36, 37 is compressed on the left-hand side between the piston 25 and the counter plate 35. Only when a sufficient torque prevails, in other words, without the interruption of the pulling force, will the disc packet on the right-hand side be relieved by screwing back of the thread portions 15, 17.

When correspondingly shifting down, the pressure in conduit 31 is relieved and the conduit 32 is acted upon by the working fluid under pressure. When the piston moves toward the right and relieves the left disc packet, the turbine shaft 3 accelerates very quickly due to its low inertia moment so that the flow of power of the lower velocity range occurs instantly. In order, when the shiftable clutch is being detached, to obtain an additional discharge of the working fluid from the pressure chamber 29 and a pressure equalization toward the interior of the disc packet, the piston portion 25 is additionally provided with an auxiliary bore 39 toward the disc packet. This bore has a smaller cross section than the pressure conduit 31 for the chamber 29. Furthermore, this bore is so arranged that the discharge is interrupted when the disc packet is compressed.

It is, of course, undersood that the present invention is, by no means, limited to the particular arrangements shown in the drawings but also comprises any modifications within the scope of the appended claims.

What we claim is:

1. In combination with a fluid transmission having a pump shaft and a turbine shaft: a gear transmission having three velocity ranges and comprising a plurality of gear sets arranged in at least two planes and on three shafts; one of said three shafts being drivingly connected to said turbine shaft, and another one of said three shafts being the gear transmission output shaft; the gears arranged in one and the same plane continuously meshing with each other; a first and a second shiftable clutch respectively mounted on two of said shafts; a first overrunning clutch mounted on the same shaft as said first shiftable clutch; a second overrunning clutch mounted on the same shaft as said second shiftable clutch; said first and said second overrunning clutches being arranged to act as power-conveying means in the first velocity range and said two shiftable clutches being arranged to be inactive in said first velocity range; means associated with said first shiftable clutch and said first overrunning clutch and operable within the second velocity range to cause said first shiftable clutch to convey power from said turbine shaft to said gear transmission output shaft while allowing said first overrunning clutch to become inactive in the transmission of power; and means associated with said second shiftable clutch and said second overrunning clutch and operable within the third velocity range to cause said second shiftable clutch to convey power from said fluid transmission through said first shiftable clutch to said transmission output shaft while allowing said second overrunning clutch to become inactive in the transmission of power.

2. A double clutch, especially for use in connection with a compound fluid transmission, which comprises in combination: a shaft arranged for driving connection with a prime mover, a first supporting member supported by and rotatable relative to said shaft, a second supporting member keyed to said shaft for rotation therewith, a shiftable friction clutch comprising first disc means carried by and rotatably connected to said first supporting member and also comprising second disc means carried by and rotatably connected to said second supporting member, fluid pressure responsive means arranged selectively to press said first and said second disc means against each other to thereby establish driving connection between said shaft and said first supporting member, a third supporting member supported by and rotatable relative to said shaft, a fourth supporting member keyed to said shaft for rotation therewith, said fourth supporting member having its outer surface provided with a thread, a nut member threadedly engaging said thread of said fourth supporting member, and an overrunning clutch including third disc means carried by and rotatably connected to said third supporting member and also including fourth disc means carried by and rotatably connected to said nut member, said nut member being operable in response to the movement thereof in one direction to press said third and fourth disc means against each other to thereby establish driving connection between said third supporting member and said shaft and also being operable in response to a movement in the opposite direction to release the pressure on said third and fourth disc means to thereby interrupt driving connection between said third supporting member and said shaft.

3. An arrangement according to claim 2, in which the surface pressure of the disc means of said overrunning clutch amounts to more than 500 lbs./sq. in., and in which the surface pressure of the disc means of said shiftable clutch is less than 200 lbs./sq. in.

4. A double clutch, especially for use in connection with a compound fluid gear transmission, which comprises in combination: a shaft arranged for driving connection with a prime mover, a first gear normally rotatable relative to said shaft, a shiftable friction clutch comprising first disc means rotatably connected to said first gear and also comprising second disc means rotatably connected to said shaft, a second gear normally rotatable relative to said shaft, an overrunning clutch including first screw means rotatably connected to said shaft and second screw means meshing with and movable on said first screw means for movement in axial direction of said shaft, said overrunning clutch also comprising third disc means rotatably connected to said second gear and further comprising fourth disc means rotatably connected to said second screw means, and fluid operable cylinder piston means interposed between said shiftable friction clutch and said overrunning clutch and comprising a first member movable in axial direction of said shaft and a second member connected to said shaft so as to be prevented from moving in axial direction thereof, the first member of said fluid operable cylinder piston means being adjacent said shiftable friction clutch for selectively pressing said first and second disc means against each other to make said clutch effective and said second member of said fluid operable cylinder piston means having a portion adjacent said overrunning clutch which forms an abutment means for the adjacent disc means of said overrunning clutch when said third and fourth disc means are pressed together in response to the movement of said second screw means toward said second member.

5. A clutch according to claim 4, in which said second member comprises flange means and also comprises at least two conduit means respectively arranged for conveying pressure fluid to and releasing fluid from either side of said flange means, and said first member having a portion extending around said flange means and being arranged to be actuated by pressure fluid on either side of said flange means, said shaft having fluid-conveying bores therethrough arranged for communication with said conduit means in said second member.

6. A double clutch, especially for use in connection with a compound fluid gear transmission, which comprises in combination: a shaft arranged for driving connection with a prime mover, a first gear normally rotatable relative to said shaft, a shiftable friction clutch comprising first disc means rotatably connected to said first gear and also comprising second disc means rotatably connected to said shaft, a second gear normally rotatable relative to said shaft, an overrunning clutch including first screw means rotatably connected to said shaft and second screw means meshing with and movable on said first screw means for movement in axial direction of said shaft, said overrunning clutch also comprising third disc means rotatably connected to said second gear and further comprising fourth disc means rotatably connected to said second screw means, a flange member rigidly connected to said shaft and having a portion forming an abutment for the adjacent disc means of said overrunning clutch, said shaft being provided with at least two bores and said flange member also being provided with at least two bores registering with the bores in said shaft and respectively leading to both sides of said flange member for conveying pressure fluid from either side of said flange member, a fluid pressure responsive member extending around a portion of said flange member and forming therewith a fluid pressure operable cylinder piston system, said fluid pressure responsive member having a portion adjacent the disc means of said shiftable friction clutch and being operable to press said first and second disc means against each other for making said friction clutch effective, the arrangement being such that the effective piston area of said fluid operable member for causing the latter to act upon the disc means of said shiftable friction clutch being greater than the effective piston area of said fluid operable member for moving the latter away from the disc means of said friction clutch.

7. A clutch according to claim 6, in which the fluid operable member comprises a bore extending from the interior of said fluid pressure operable cylinder piston system to the discs of said shiftable friction clutch, said last mentioned bore having a diameter smaller than the diameter of the bores in said shaft.

References Cited in the file of this patent

UNITED STATES PATENTS

| | | |
|---|---|---|
| 2,187,835 | Martin | Jan. 23, 1940 |
| 2,280,683 | Bedford | Apr. 21, 1942 |
| 2,301,930 | Cattaneo | Nov. 17, 1942 |
| 2,606,452 | Dyer | Aug. 12, 1952 |